(12) United States Patent
Maney, Jr. et al.

(10) Patent No.: US 11,811,719 B1
(45) Date of Patent: Nov. 7, 2023

(54) ROUTING INCOMING SERVICE MESSAGES TO SERVICE REPRESENTATIVES

(71) Applicant: UIPCO, LLC, San Antonio, TX (US)

(72) Inventors: Will Kerns Maney, Jr., San Antonio, TX (US); Ruthie D. Lyle, Durham, NC (US); Celena Dortch, San Antonio, TX (US); David Jason Anderson James, San Antonio, TX (US); Salvador Adrian Bretado, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 156 days.

(21) Appl. No.: 17/363,586

(22) Filed: Jun. 30, 2021

Related U.S. Application Data

(60) Provisional application No. 63/046,127, filed on Jun. 30, 2020.

(51) Int. Cl.
| | |
|---|---|
| *H04L 12/58* | (2006.01) |
| *H04L 51/48* | (2022.01) |
| *G10L 15/22* | (2006.01) |
| *G10L 15/18* | (2013.01) |
| *G06F 3/16* | (2006.01) |
| *G10L 25/63* | (2013.01) |
| *G06F 40/30* | (2020.01) |
| *H04L 51/42* | (2022.01) |

(52) U.S. Cl.
CPC ............. *H04L 51/48* (2022.05); *G06F 3/165* (2013.01); *G06F 40/30* (2020.01); *G10L 15/1815* (2013.01); *G10L 15/22* (2013.01); *G10L 25/63* (2013.01); *H04L 51/42* (2022.05)

(58) Field of Classification Search
CPC ......... H04L 51/48; H04L 51/42; G06F 3/165; G06F 40/30; G10L 15/1815; G10L 15/22; G10L 25/63
See application file for complete search history.

(56) References Cited

U.S. PATENT DOCUMENTS 11,451,503 B2 * 9/2022 McSwiggan .......... H04L 51/214
2019/0355043 A1 * 11/2019 Swierk .................... G10L 25/63
(Continued)

*Primary Examiner* — Gil H. Lee
*Assistant Examiner* — Juan C Turriate Gastulo
(74) *Attorney, Agent, or Firm* — Plumsea Law Group, LLC

(57) ABSTRACT

One or more servers are provided for processing incoming service messages for customers which are account holders of accounts that are managed at least in part by a service provider. An incoming service message may be received from a user device via a network. The incoming service message may include free-form input data (e.g. free-form text data or free-form audio data). The free-form input data may be processed to determine one or more intent classifiers and/or one or more emotion classifiers using artificial intelligence, e.g. a natural language understanding function. A service department identifier may be selected based on at least the one or more intent classifiers or the one or more emotion classifiers. A message may be sent to a selected service representative identifier associated with the selected service department identifier, where the message includes an identifier for identifying information associated with the incoming service message.

20 Claims, 12 Drawing Sheets

(56) References Cited

U.S. PATENT DOCUMENTS

| | | | |
|---|---|---|---|
| 2020/0058295 A1* | 2/2020 | Debnath | G10L 15/22 |
| 2020/0227026 A1* | 7/2020 | Rajagopal | G06F 16/244 |
| 2021/0158813 A1* | 5/2021 | Sivasubramanian | G06Q 30/016 |
| 2021/0224818 A1* | 7/2021 | Choudhary | G06N 3/045 |

* cited by examiner

ROUTING INCOMING SERVICE MESSAGES TO SERVICE REPRESENTATIVES

This application claims the benefit of U.S. Provisional Patent Application Ser. No. 63/046,127 filed on Jun. 30, 2020 and titled "Routing Incoming Service Messages to Service Representatives", the disclosure of which is incorporated by reference in its entirety.

TECHNICAL FIELD

The present disclosure generally relates generally to techniques and mechanisms for processing incoming service messages for routing to service representatives associated with a service provider, and more particularly to techniques and mechanisms for processing of such incoming service messages having free-form text or audio.

BACKGROUND

A financial services organization may provide financial services to its users. For example, the financial services may include one or more of banking, insurance, credit cards, and the like. Each user may be an account holder of one or more accounts that are managed at least in part by a service provider of the organization.

To send a service message to a service representative associated with the organization, the user may interact with a user device having a display for displaying a graphical user interface (GUI). As the service provider is often associated with a relatively large number of different service departments, the GUI may provide a large number user input selection items and/or drop-down menus which include a large number of different menu items for user selection. The user may get confused by such a relatively large number of different options. Service messages may be misrouted and/or lost, leading to a frustrating experience.

There is a need in the art for techniques and mechanisms that address the problems discussed above as well as related issues.

SUMMARY

In one aspect, a method of processing incoming service messages for customers which are account holders of accounts that are managed at least in part by a service provider is provided. The method may include receiving an incoming service message from a user device via a network, where the incoming service message includes free-form input data from the user device; processing the free-form input data to determine one or more intent classifiers; selecting one of a plurality of service department identifiers based on the one or more intent classifiers; selecting one of a plurality of service representative identifiers associated with the selected service department identifier; and sending a message to the selected service representative identifier, where the message includes an identifier for identifying information associated with the incoming service message. The free-form input data may be free-form text data or free-form audio data. In some embodiments, an artificial intelligence function (e.g. a natural language understanding function) may be used in the processing of the free-form input data. In further embodiments, processing the free-form input data may include processing the free-form input data to determine one or more emotion classifiers, and selecting the service department identifier may include selecting the service department identifier based on the one or more intent classifiers and the one or more emotion classifiers.

In another aspect, a computing device (e.g. a server) may include one or more processors, a network interface for connecting to a network for communications with a user device, and memory for storing instructions which are executable on the one or more processors. The instructions may be for receiving an incoming service message from a user device via a network, where the incoming service message includes free-form input data from the user device; processing the free-form input data to determine one or more intent classifiers; selecting one of a plurality of service department identifiers based on the one or more intent classifiers; selecting one of a plurality of service representative identifiers associated with the selected service department identifier; and sending a message to the selected service representative identifier, where the message includes an identifier for identifying information associated with the incoming service message. The free-form input data may be free-form text data or free-form audio data. In further embodiments, an artificial intelligence function (e.g. a natural language understanding function) may be used in the processing of the free-form input data.

In yet another aspect, a computer program product may include a non-transitory computer readable medium and instructions stored in the non-transitory computer readable medium. The instructions may be executable by one or more processors (e.g. of a server) for receiving an incoming service message from a user device via a network, where the incoming service message includes free-form input data from the user device; processing the free-form input data to determine one or more intent classifiers and one or more emotion classifiers; selecting one of a plurality of service department identifiers based on the one or more intent classifiers and the one or more emotion classifiers; selecting one of a plurality of service representative identifiers associated with the selected service department identifier; and sending a message to the selected service representative identifier, the message including an identifier for identifying information associated with the incoming service message. The free-form input data may be free-form text data or free-form audio data. In further embodiments, an artificial intelligence function (e.g. a natural language understanding function) may be used in the processing of the free-form input data.

Other techniques, mechanisms, features, and advantages of the disclosure will be, or will become, apparent to one of ordinary skill in the art upon examination of the following figures and detailed description. It is intended that all such additional techniques, mechanisms, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

Figure 1:
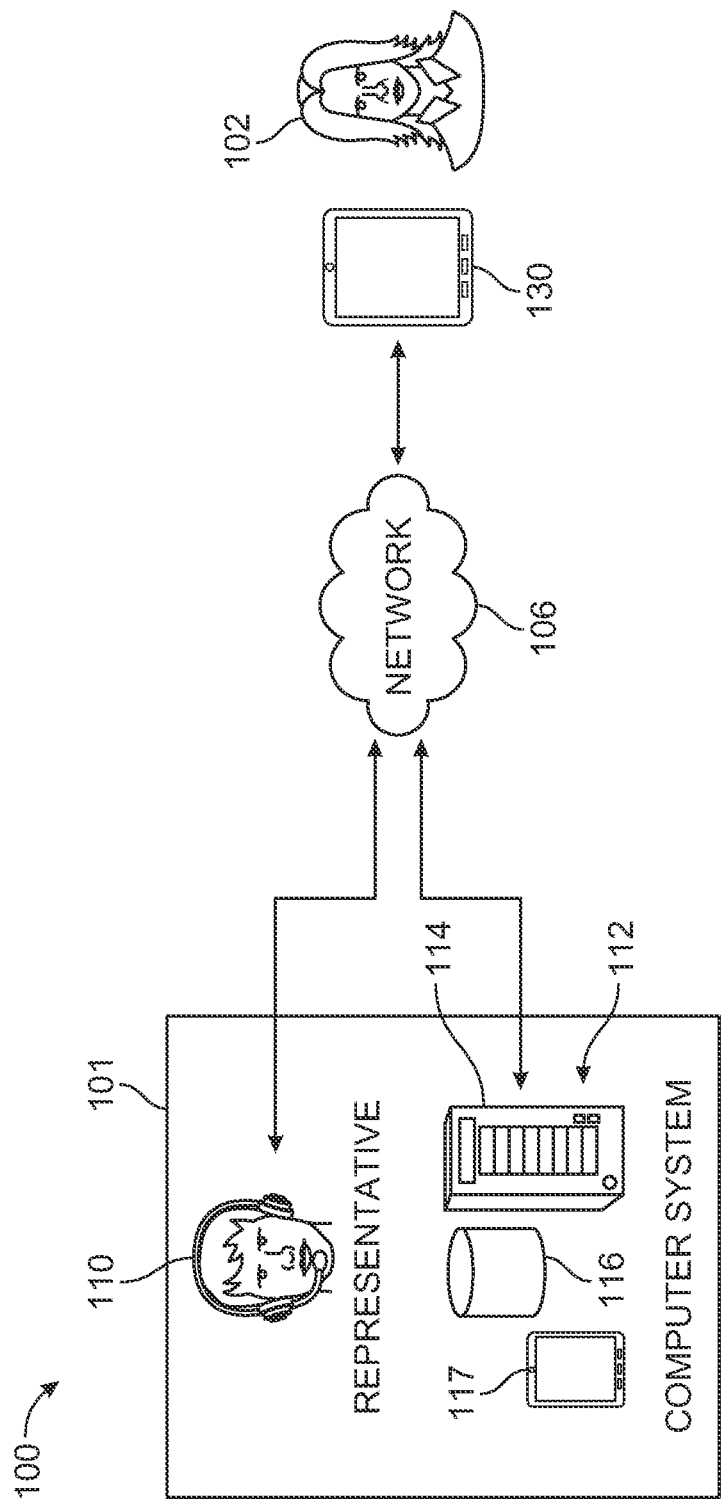
FIG. 1 is a schematic block diagram of a communication system for communications between a service provider (e.g.
Figure 2:
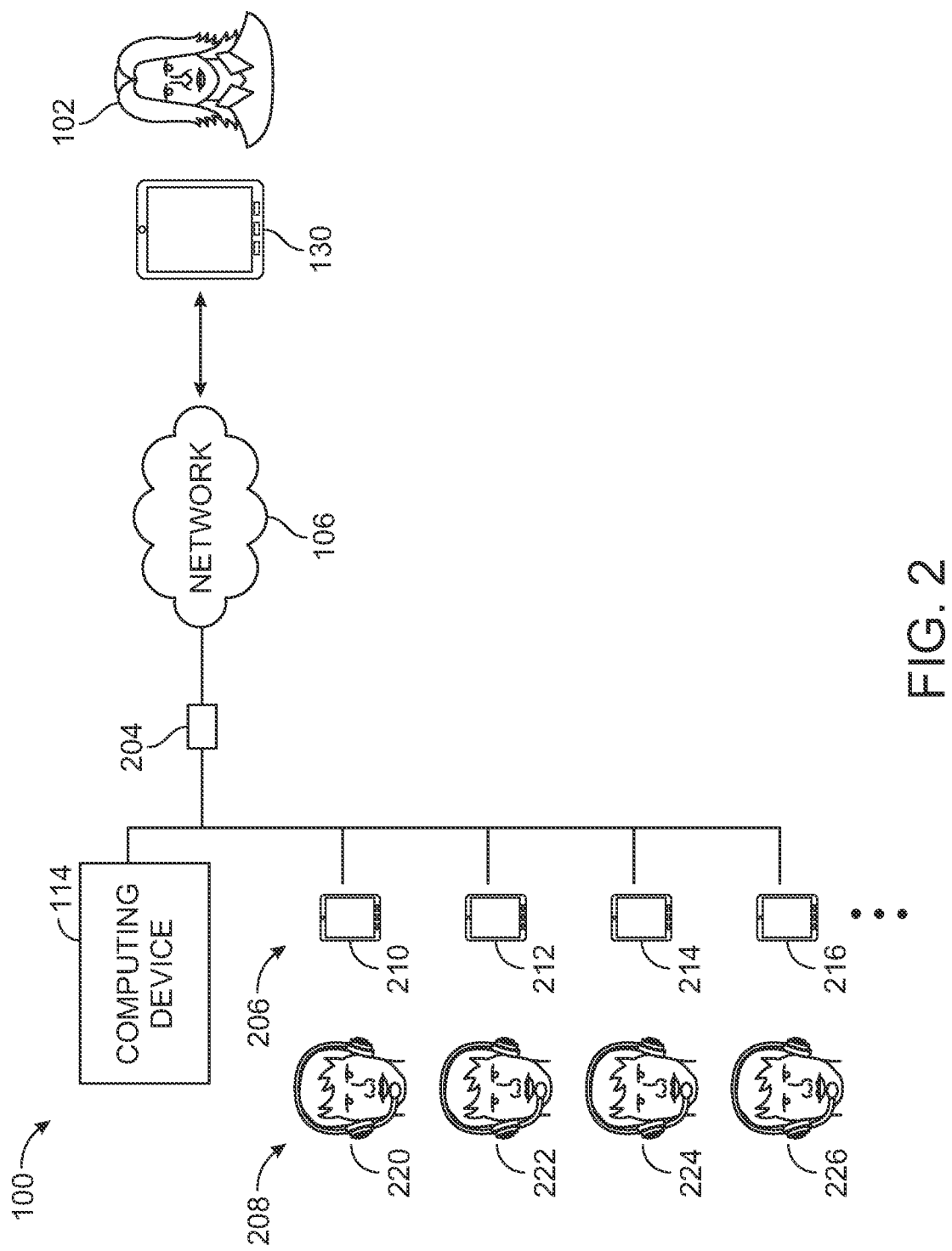
Figure 3:
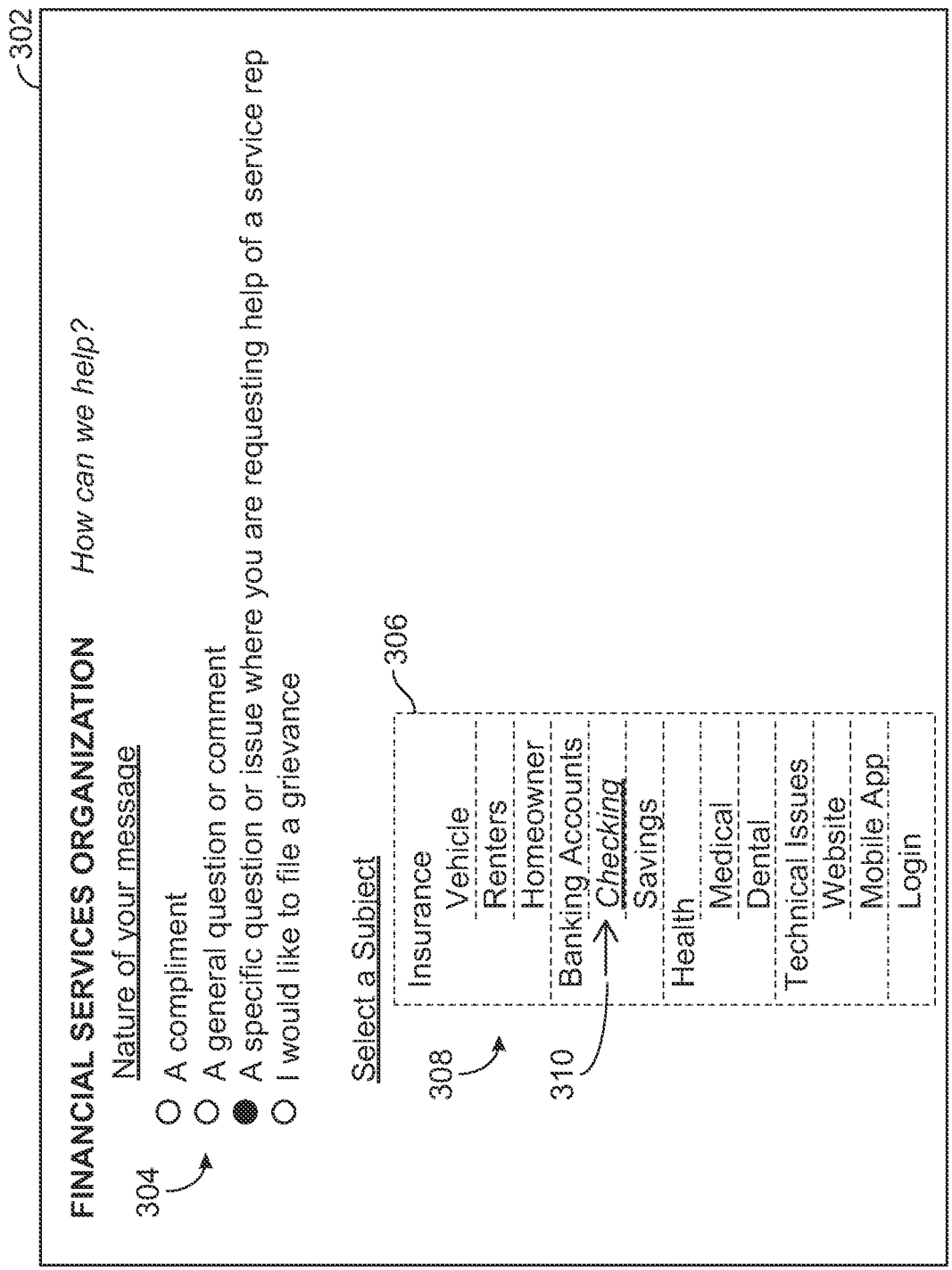
Figure 4:
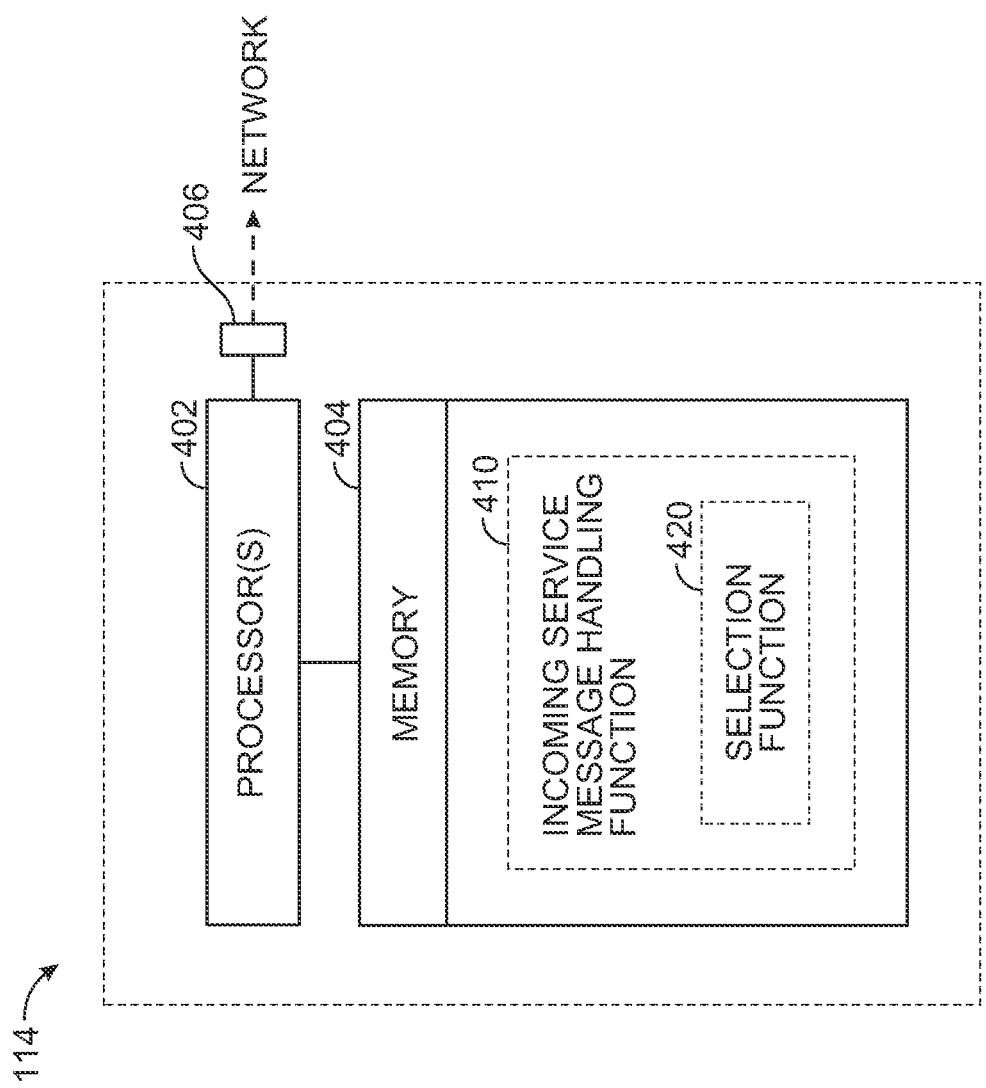
Figure 5:
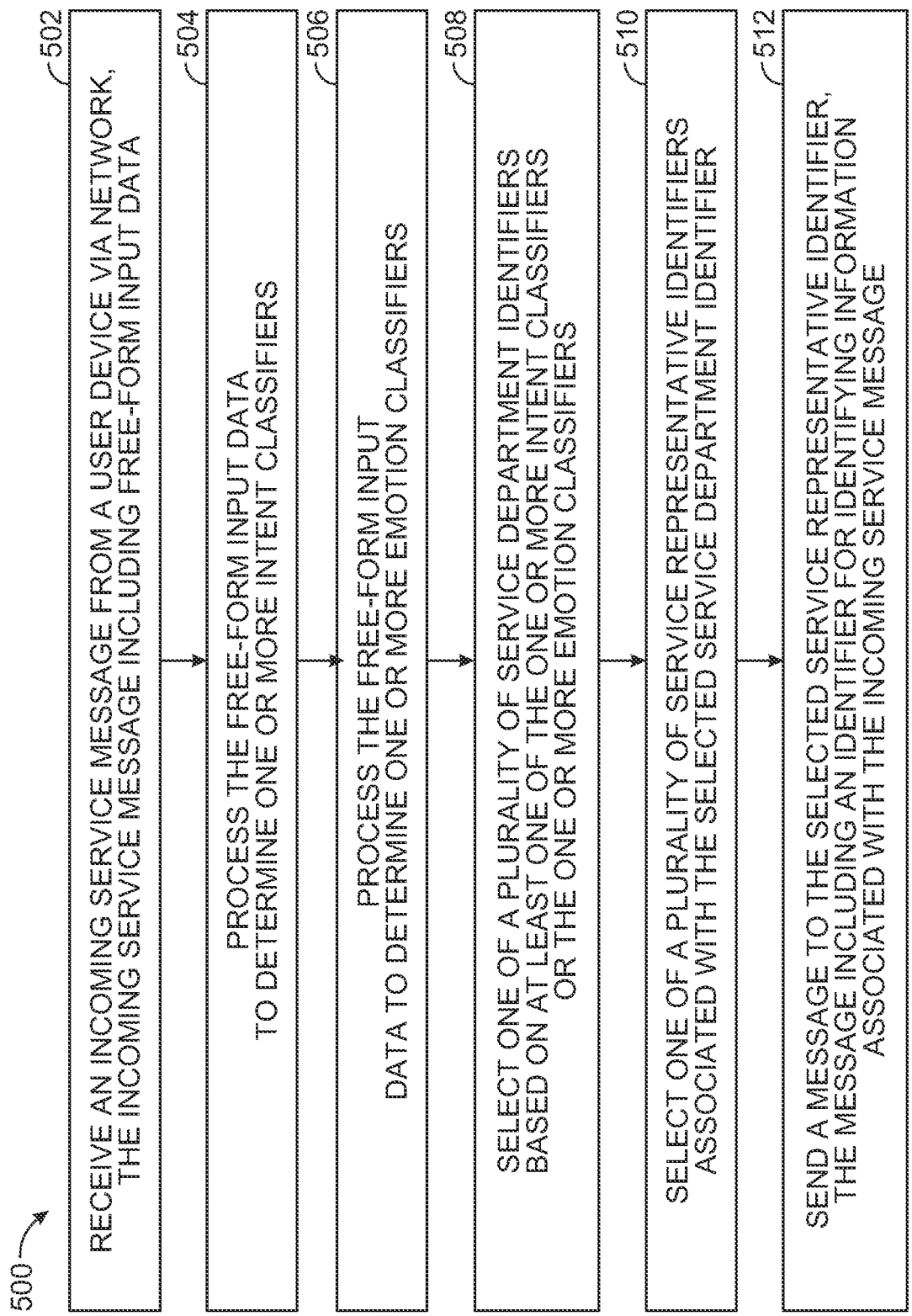
Figure 6:
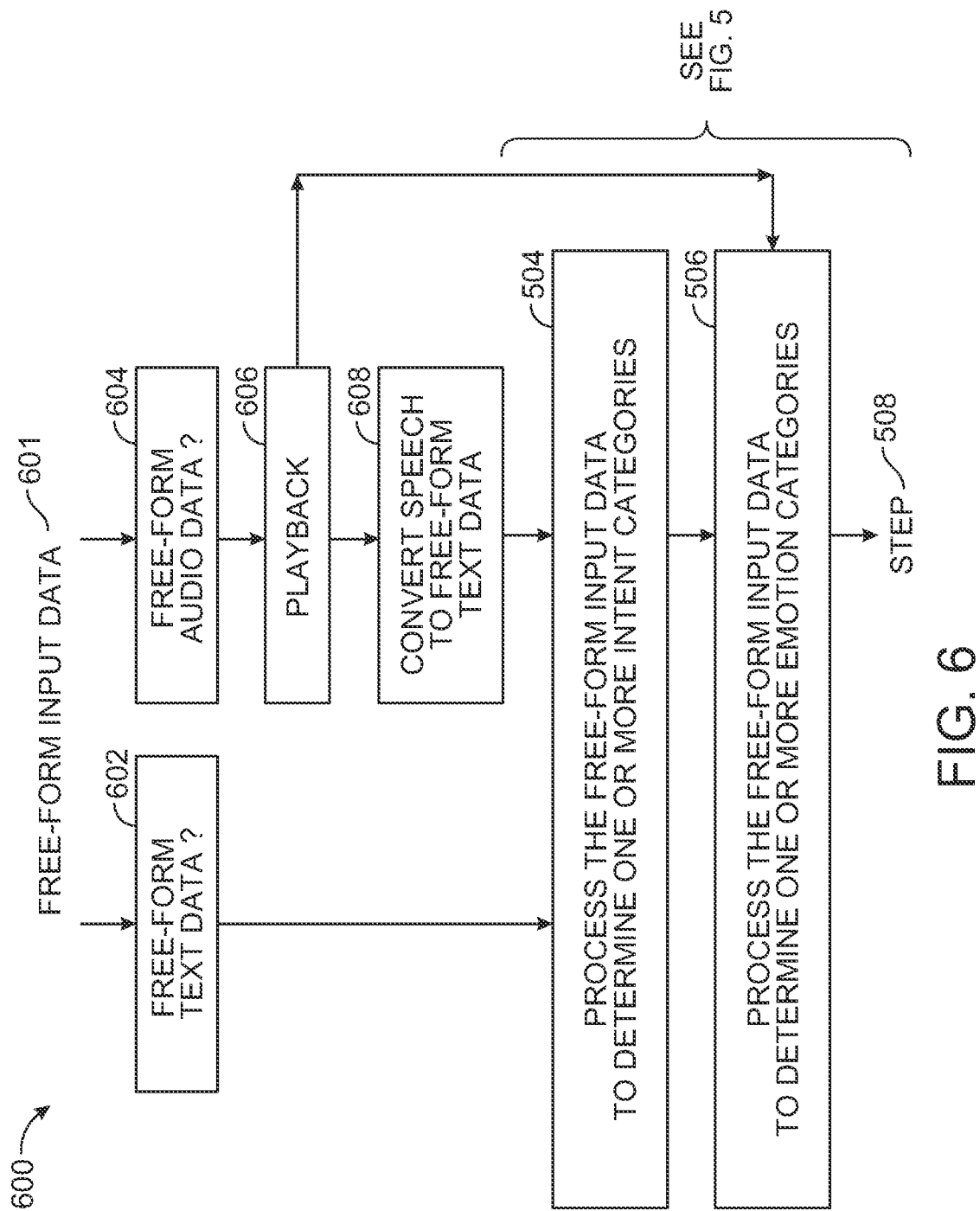
Figure 7:
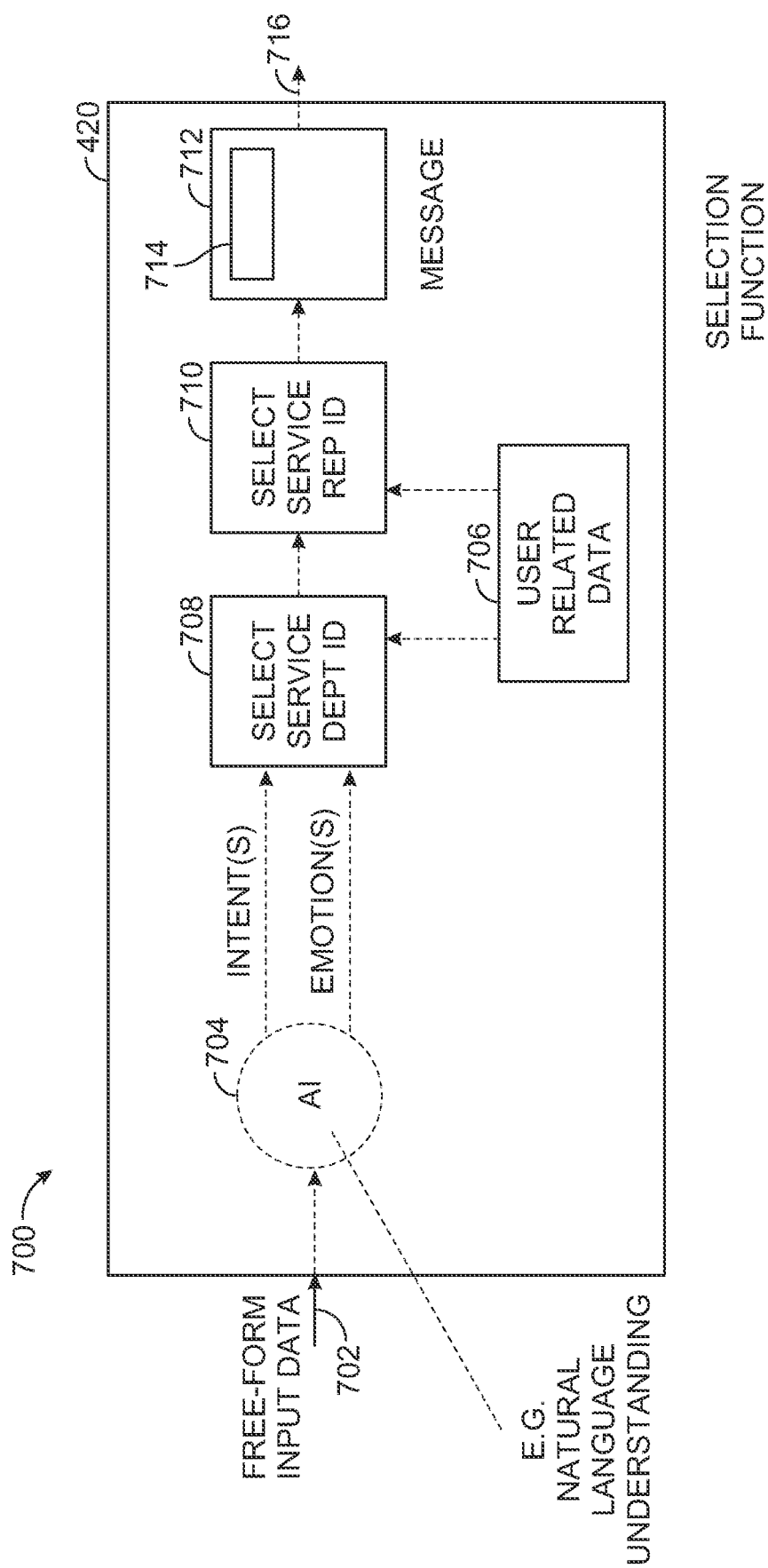

a computing device thereof) and a user (e.g. a user device thereof) via one or more networks, according to an example embodiment;

FIG. 2 is the schematic block diagram of the communication system of FIG. 1, but further revealing that the service provider may involve a plurality of representatives associated with a plurality of different service departments;

FIG. 3 is an illustration of display data for display associated with a traditional method of processing incoming service messages;

FIG. 4 is a schematic block diagram of a computing device of the service provider of FIG. 1, according to an example embodiment;

FIG. 5 is a flowchart for describing a method of processing incoming service messages, according to an example embodiment;

FIG. 6 is a flowchart for describing a method of processing incoming service messages according to an example embodiment, which may be used in the method of FIG. 5 for pre-processing data;

FIG. 7 is a schematic process diagram for a method of processing incoming service messages at a selection function of an incoming service message handling function, according to an example embodiment; and FIGS. 8-12 are illustrations of display data for display associated with a method of processing incoming service messages, according to some embodiments.

DESCRIPTION OF EMBODIMENTS

As described in the Background section, a financial services organization may provide financial services to its users. For example, the financial services may include one or more of banking, insurance, credit cards, and the like. Each user may be an account holder of one or more accounts that are managed at least in part by a service provider of the organization. To send a service message to a service representative associated with the organization, the user may interact with a user device having a display for displaying a graphical user interface (GUI). As the service provider is often associated with a relatively large number of different service departments, the GUI may correspondingly provide a large number of user input selection items and/or dropdown menus which include a large number of different menu items for user selection. The user may get confused by such a relatively large number of different options. Service messages may be misrouted and/or lost, leading to a frustrating experience.

Techniques and mechanisms of the present disclosure are for use in processing incoming service messages for service representatives associated with a service provider, and, more specifically, to techniques and mechanisms for processing such incoming service messages having free-form text or audio from a user.

According to the example embodiments described herein, the user is allowed to use a mode of communication that is most natural to them, free-form text or free-form audio, and artificial intelligence (AI) is leveraged against that input. The AI may determine one or more intent classifiers and/or one or more emotion classifiers based on the free-form input data. A message may be generated and routed an appropriate service department and service representative based on the one or more intent classifiers and/or the one or more emotion classifiers. The message may be routed together with an identifier, such as a knowledge delivery instruction, for identifying associated information useful for the service representative. A machine learning function may be utilized for modeling and training this process.

In some embodiments, the techniques and mechanisms of the present disclosure may utilize intent and emotion information obtained from audio or natural language understanding (NLU) from text to identify keywords assigned to different categories or teams for user assistance. In example embodiments, the techniques and mechanisms may also use user information, such as user products and services, last communications or bill, previous service representative interaction, etc., to route the user's message to the appropriate department, category or team for assistance. Some types of messages, such as member grievances/complaints, may require assistance from a specialized group or are required to be handled in a particular way.

In some embodiments, the AI can make real-time guesses/predictions of the appropriate category for which the member is requesting assistance and provide an "auto-complete" type of recommendation that the member can select. The prediction or recommendation can also include recommended tags or relevant categories and/or subcategories based on the member input that can be confirmed or canceled by the member.

To better illustrate the techniques and mechanism described herein in relation to the Figures, FIG. 1 is a schematic block diagram of a communication system 100 for communications between a service provider 101 (e.g. a computing device thereof) and a user 102 (e.g. a user device thereof) via one or more networks 106. Service provider 101 may be a company or any other organization that provides financial services to its users. In one embodiment, service provider 101 could be a bank. In another embodiment, service provider 101 could be an insurance company. In another embodiment, service provider 101 could be a company that provides banking services and insurance services as well as other kinds of services. User 102 could be a customer, member, or could be any other user of services provided by service provider 101.

In some embodiments, service provider 101 is associated with a financial services organization which provides various financial services (e.g., banking, insurance, credit cards, and the like) to its users. Each user may be an account holder of one or more accounts that are managed at least in part by service provider 101 (e.g., via a financial services site or website).

To facilitate interactions with customers, members or general users of its services, service provider 101 may include at least one service representative 110. As used herein, the term "service representative" (or simply, "representative") refers to any individual operating in a capacity to represent a service provider in interactions with a customer or user. The representative could be, for example, an employee at a call center. A representative could operate within a larger customer service system (or department) of service provider 101. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

Service provider 101 is also comprised of at least one computer system 112. The term "computer system" refers to the computing resources of a single computer, the partial computing resources of a single computer, a plurality of computers communicating with one another, or a network of remote servers. In an exemplary embodiment, computer system 112 includes at least one server. In the embodiment of FIG. 1, computer system 112 comprises one or more computing devices 114 (e.g., a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory.

Representative 110 may have access to a device of computer system 112. In the exemplary embodiment of FIG. 1, representative 110 may have access to representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review user records, send documents and forms to a user and/or perform other tasks required to help the user.

User 102 may have access to a user device 130. In the exemplary embodiment of FIG. 1, user device 130 comprises a mobile device. For example, user device 130 could be a smartphone or a tablet computer. In other embodiments, however, a user device could comprise a tablet, a laptop, a desktop computer, or similar kind of device.

Both representative device 117 and user device 130 may comprise computer systems for processing and communicating information. Each device may generally include one or more processors, a data storage component such as a memory, and a display. Each device may also include components to facilitate communication with external systems (for example, hardware and software components to enable communication over a network). In some cases, a device includes one or more input devices. These could include a keyboard, mouse, or one or more physical buttons integrated into a case of the device. In some cases, a device includes touchscreen controls.

User device 130 could operate in a client-server relationship with one or more servers of computer system 112. For example, computer system 112 may include a server that communicates with user device 130 as well as other remote devices over network 106. User device 130 may provide the front-end of a system that provides users with options for performing various kinds of tasks (for example, making fund transfers when the company is a bank). In some cases, user device 130 may run client software through a web browser, in which case the client software may be hosted on a server associated with computer system 112. In other cases, user device 130 may run client software in the form of a native software application that has been downloaded through a centralized marketplace (i.e., an "app store"). In some cases, while the client software that allows users to perform various tasks may be run on user device 130, the data may be retrieved from and stored on databases associated with computer system 112.

FIG. 2 is a schematic block diagram of communication system 100 of FIG. 1, further revealing that the service provider may involve a plurality of representatives 208 (e.g., representatives 220, 222, 224, and 226) associated with a plurality of different service departments (e.g., including groups, sub-groups, etc.). Although FIG. 2 shows only four (4) representatives 208 for simplicity, it will be appreciated that the service provider may involve a much larger number of representatives (e.g., 10's, 100's, or even 1000's or more). Each one of representatives 208 may be associated with a particular level of experience, a particular level of expertise within a department or group, and/or particular level of expertise with respect to one or more products and/or services. The plurality of representatives 208 may be respectively associated with a plurality of representative devices 206 (e.g., representative devices 210, 212, 214, and 216). A plurality of service representative identifiers or addresses may be associated with the plurality of representatives 208 and/or representative devices 206. An incoming service message from network 106 may be received at an entry point 204 and need to be routed to a proper one of the plurality of representatives 208, as determined by computing device 114.

FIG. 3 is an illustration of display data 302 for display associated with a traditional method of processing incoming service messages. Display data 302 is sent from a computing device of the service provider to the user device of a user for display as a GUI. The GUI is for use by the user to send a service message to a service representative. The GUI may include a user input selection to select one of a plurality of predetermined service message types ("nature of your message") (e.g., a compliment, a general question or comment, a specific question or issue, or a grievance). The GUI may further include a drop-down menu including a plurality of different menu items corresponding to many different service departments. In this example, the different service departments indicated include insurance (e.g., vehicle, renters, homeowner), banking (e.g., checking or savings), health (e.g., medical or dental), and technical issues (e.g., website, mobile app, or login). One or more additional drop-down menus may be included as well. Here, the user may get confused by the relatively large number of different options of the multi-level input selection.

In a service organization such as a large financial services organization, a very large number of departments and groups may exist, which further adds to confusion of the user for communicating a service message. For example, the financial services organization may include service departments corresponding to insurance (auto insurance, renters insurance, homeowner insurance, rental property insurance, valuable personal property insurance, condo insurance, flood insurance, life insurance, annuities, umbrella insurance, motorcycle RV & boat insurance, small business insurance, additional insurance solutions); banking (checking accounts, savings accounts, credit cards, auto loans, car buying service, CDs, home mortgages, personal loans, motorcycle, RV & boat loans, youth banking, account services, investments, brokerage & trading, mutual funds & ETFs IRAs & rollovers, education 529 plans, automated investing, plan with an advisor); real estate (mortgage rates, mortgages, VA loans, refinance, mortgage payment assistance options); retirement (retirement income, IRAs & rollovers, annuities, long-term care); health insurance (dental, vision, Medicare); and more.

FIG. 4 is a schematic block diagram of computing device 114 (e.g., a server) of FIG. 1. Computing device 114 of FIG. 4 may include one or more processors 402, a network interface 406 for connecting to a network for communications with a user device, and memory 404 for storing instructions which are executable on the one or more processors 402. The instructions may be executable to provide an incoming service message handling function 410 of the present disclosure. The incoming service message handling function 410 may be configured for processing incoming service messages for customers which are account holders of accounts that are managed at least in part by a service provider. Incoming service message handling function 410 may include a selection function 420 for selection of service department identifiers/addresses as described herein. Operation of incoming service message handling function 410 with selection function 420 will be described in relation to the figures below.

FIG. 5 is a flowchart for describing a method 500 of processing incoming service messages according to some embodiments of the present disclosure. This service may be facilitated for customers or users of a financial services organization, where each user is an account holder of one or more accounts that are managed at least in part by a service provider. The method may be performed at least in part by a computing device (e.g., a server) associated with the site. The method may be embodied in a computer program product having a non-transitory computer readable medium and instructions stored in the non-transitory computer readable medium, where the instructions are executable by one or more processors of the computing device to perform steps of the method.

In an example embodiment, method 500 may begin when an incoming service message from a user device via a network is received (step 502 of FIG. 5). The incoming service message may include free-form input data from the user device. In some embodiments, the free-form input data are free-form text data input at the user device. In other embodiments, the free-form input data are free-form audio data input at the user device, which may be processed according to the method provided in relation to FIG. 6. In any event, the free-form input data may be processed to determine one or more intent classifiers (step 504 of FIG. 5). The free-form input data may also be processed to determine one or more emotion classifiers (step 506 of FIG. 5). In some embodiments, an artificial intelligence function may be used for the processing in steps 504 and/or 506. For example, the artificial intelligence function may be a natural language understanding function.

One of a plurality of service department identifiers may be selected based on the one or more intent classifiers and/or the one or more emotion classifiers (step 508 of FIG. 5). The plurality of service department identifiers may correspond to a plurality of different service departments (e.g., including groups and/or sub-groups, etc.). One of a plurality of service representative identifiers associated with the selected service department identifier may be selected (step 510 of FIG. 5). The plurality of service representative identifiers may correspond to a plurality of different service representatives or service representative addresses or numbers for communicating with the service representatives.

In some embodiments, the service representative may be selected in the same manner based on the one or more intent classifiers and/or the one or more emotion classifiers, as each service representative is associated with a particular level of experience, a particular level of expertise within a department or group, and/or particular level of expertise with respect to one or more products and/or services.

In some embodiments, a machine learning function may be utilized for modeling and training this process.

In some embodiments, the selections may be provided to the user for viewing, with or without requiring user confirmation. Data for display at the user device may be sent via the network, where the data for display includes a display item corresponding to the selected service department identifier and/or the selected service representative identifier. The display item may comprise a user input prompt for user confirmation of the selected service department identifier and/or the selected service representative identifier.

A message may then be generated and sent to the selected service representative identifier, where the message includes an identifier for identifying information associated with the incoming service message (step 512 of FIG. 5). In some embodiments, the identifier may be a point or link for identifying or locating (e.g. in a database) the information associated with the incoming service message. The identifier may be referred to as a knowledge delivery article. The message may include any other pertinent information as necessary (e.g., attributes such as a product or service identifier). The message may routed for delivery to the selected service representative identifier.

In some embodiments, the server may maintain access to a plurality of stored rules (e.g., enterprise regulatory or business rules). Here, each incoming service message may be processed in accordance with a selected one of a plurality of message handling instructions based on a matching (from a comparison) of the one or more intent classifiers and/or one or more emotion classifiers with one of the plurality of stored rules.

In some embodiments, the free-form input data may be processed substantially in real-time (e.g., in regular or periodic chunks of data) with feedback given substantially in real-time (e.g., in regular or periodic intervals) at the user device. In such embodiments, the incoming service message which includes the free-form input data may be received in a plurality of consecutive message portions during input of the free-form input data at the user device. When free-form text data is used, each next portion of text data is provided; when free-form audio data is used, each next portion of audio data is provided in a smaller audio clip or file. For each consecutive message portion received, the processing and the selecting of the service department identifier may be repeated, where updated data for display at the user device may be sent via the network. Each updated data for display may include an updated display item corresponding to an updated selected service department identifier for real-time feedback during the input of the free-form input data.

FIG. 6 is a flowchart for describing a method 600 of processing incoming service messages according to some embodiments of the present disclosure. In some embodiments, method 600 shown in FIG. 6 may be used as part of method 500 (shown in FIG. 5) for pre-processing data. As described above, the free-form input data may be free-form text data or free-form audio data. Free-form text data may be input or entered at a user device in one or more text field boxes (e.g., a single text field box). On the other hand, free-form audio data may be input via a microphone of the user device. In some embodiments, display data at the user device provides for a user selection of one of text input or audio input.

If the free-form input data is free-form text data (step 602 of FIG. 6), then the free-form text data may be processed in steps 504 and 506 of method 500 shown above in FIG. 5 as previous described (e.g., using a natural language understanding function or other AI). If the free-form input data is free-form audio data (step 604 of FIG. 6), then the free-form audio data may be processed for playback (step 606 of FIG. 6). The free-form audio data may be received as an audio clip or file that was recorded at the user device. A playback function may be performed to playback the free-form audio data to generate a (free-form) audio signal of the voice of the user. The (free-form) audio signal may be processed to determine one or more emotion classifiers based on the audio signal in step 508 of method 500. Here, speech analytics may be utilized to "metricize" emotion with acoustic measures (e.g., how someone said something) to add to what they said; word tempo, agitation, and percent silence may capture various emotions, such as contentness, frustration, disappointment, peace, or indifference. The audio signal may further be processed for converting speech/voice to free-form text data (step 608 of FIG. 6), where this free-form text data may then be utilized in in step 506 of method 500 in FIG. 5 above.

FIG. 7 is a schematic process diagram for a method 700 of processing incoming service messages at selection function 420 of computing device 114, according to some embodiments. Method 700 may begin when an incoming service message may be received from a user device via a network. The incoming service message may include free-form input data which are received at an input 702 of selection function 420. The free-form input data may be provided to an AI function 704 (e.g., a natural language understanding function). The AI function 704 may process the free-form input data to determine one or more intent classifiers and one or more emotion classifiers based on the free-form input data. At 708, one of a plurality of service department identifiers may be selected based on at least one of the one or more intent classifiers or the one or more emotion classifiers. At 710, one of a plurality of service representative identifiers associated with the selected service department identifier may be selected. In some embodiments, the selection of the service representative identifier may also be made based on the one or more intent classifiers or the one or more emotion classifiers.

In some embodiments, the selection of the service department identifier and/or service representative identifier at 708 and 710 may be further made based on user-related data 706 associated with an account of the user. The user-related data may be or include historical satisfaction data of the user (e.g., service ratings or customer satisfaction surveys of the user, previous compliments or complaints from the user); historical service data of the user (e.g., current accounts, products, services, and/or subscriptions of the user); and/or status data associated with the account of the user (e.g., pending account alerts, incomplete service processes).

A message may be generated for delivery to the selected service representative identifier. In some embodiments, the selected service representative identifier may be an address or number for communicating or contacting a selected service representative. The message may include an identifier 714 for identifying information associated with the incoming service message. In some embodiments, the identifier may be a point or link for identifying or locating (e.g., in a database) the information associated with the incoming service message. The identifier may be referred to as a knowledge delivery article. The message may include any other pertinent information as necessary. The message may be provided at an output 716 for routing and delivery to the selected service representative identifier.

In some embodiments, the server may maintain access to a plurality of stored rules (e.g., enterprise regulatory or business rules). Here, each incoming service message may be processed in accordance with a selected one of a plurality of message handling instructions based on a matching (from a comparison) of the one or more intent classifiers and/or one or more emotion classifiers associated with the incoming service message and one of the plurality of stored rules.

In some embodiments, the free-form input data may be processed substantially in real-time (e.g., in regular or periodic chunks of data) with feedback given substantially in real-time (e.g., in regular or periodic intervals) at the user device. In such embodiments, the incoming service message which includes the free-form input data may be received in a plurality of consecutive message portions during input of the free-form input data at the user device. When free-form text data is used, each next portion of text data is provided; when free-form audio data is used, each next portion of audio data is provided in a smaller audio clip or file. For each consecutive message portion received, the processing and the selecting of the service department identifier may be repeated, where updated data for display at the user device may be sent via the network. Each updated data for display may include an updated display item corresponding to an updated selected service department identifier for real-time feedback during the input of the free-form input data.

FIGS. 8-12 are illustrations of display data for display at a user device, associated with a method of processing incoming service messages according to some embodiments. These figures are used for demonstrating at least some of the techniques and features described above in relation to FIGS. 1-7.

Figure 8:
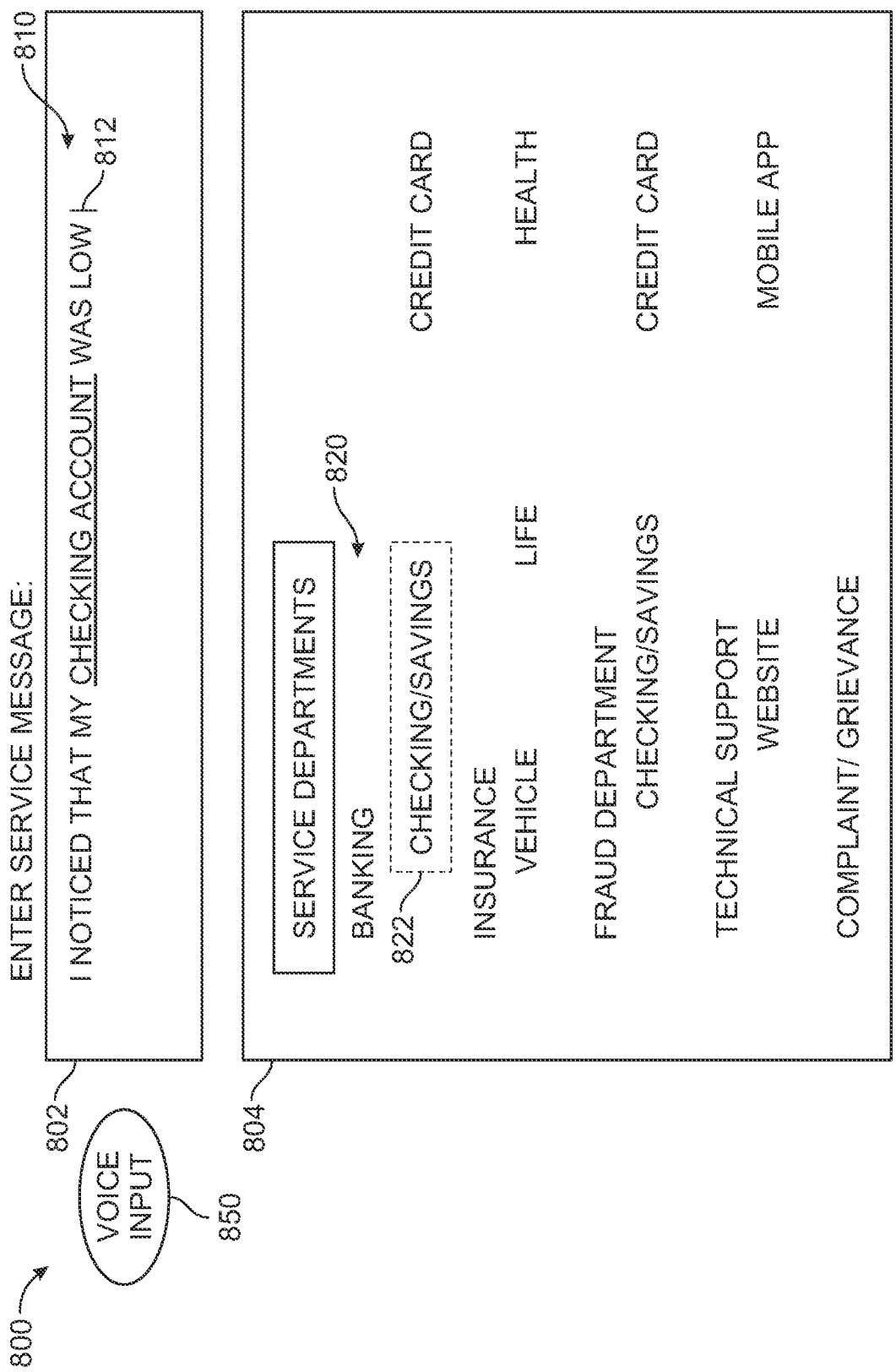

In FIG. 8, a visual display of a user device shown to provide display data 800 as a GUI based on display data sent from the service provider. As described above, the free-form input data may be provided as free-form text data or free-form audio data. Free-form text data may be input or entered at the user device in one or more text field boxes, such as a text field box 802. In some embodiments, display data 800 provides for a user selection of one of text input or audio input (see, e.g., a voice input prompt 850 for activating audio/voice recording for generation of an audio clip or file).

A display area 804 provides for a display of a plurality of service departments indicators 820 for the financial services organization. Here, the service department indicators 820 correspond to service departments including banking which may be associated with checking/savings or credit cards; insurance which may be associated with vehicle, life, or health; fraud which may be associated with checking/savings or credit cards; technical support which may be associated with website or mobile app; and complaint/grievance.

As shown in FIG. 8, free-form text data 810 is shown to indicate "I noticed that my checking account was low." A cursor 812 is left at the end of the statement or phrase. As for now, it seems that the user intends to speak with someone in the banking/checking account department. Example detected intents and emotions are shown as underlined text (e.g. checkingaccount). In display area 804, an indicator 822 (e.g., a highlighter, icon, box, etc.) may be used to emphasize the selected service department (i.e., banking—checking account) as determined by the incoming serving message handling function. As described above in relation to FIG. 7, the free-form input data may be processed substantially in real-time (e.g., in regular or periodic chunks of data) with feedback given substantially in real-time (e.g., in regular or periodic intervals) at the user device. Accordingly, the selected service department may merely be a currently-selected service department which is based on free-form text data 810 which is merely an initial portion of text data.

Figure 9:
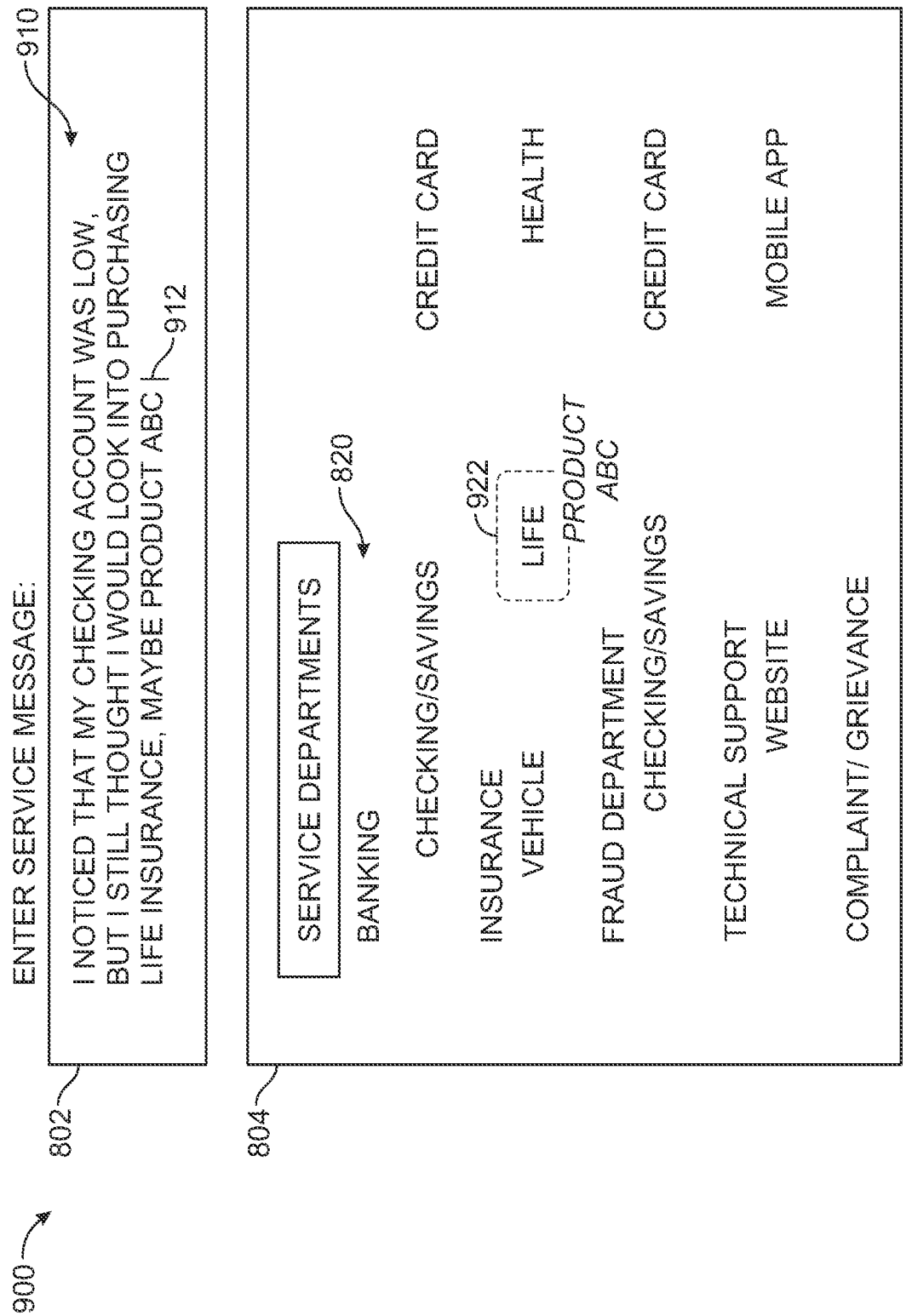

As shown in FIG. 9, continued free-form text data 910 is shown to indicate "I noticed that my checking account was low" with an additional message portion indicating "but I still thought I would look into purchasing life insurance, maybe product ABC." A cursor 912 is left at the end of the statement or phrase. Now it seems that the user may intend to speak with someone in the life insurance department about product ABC. Example detected intents and emotions are shown as underlined text (e.g., checkingaccount, lifeinsurance, productABC). In display area 804, an indicator 922 (e.g., a highlighter, icon, box, etc.) may be used to emphasize the selected service department (i.e., insurance—life—product ABC) as determined by the incoming serving message handling function. In some embodiments, indicator 922 is a moving or movable indicator. Here, again, the free-form input data is being processed substantially in real-time (e.g., in regular or periodic chunks of data) with feedback given substantially in real-time (e.g., in regular or periodic intervals) at the user device.

Figure 10:
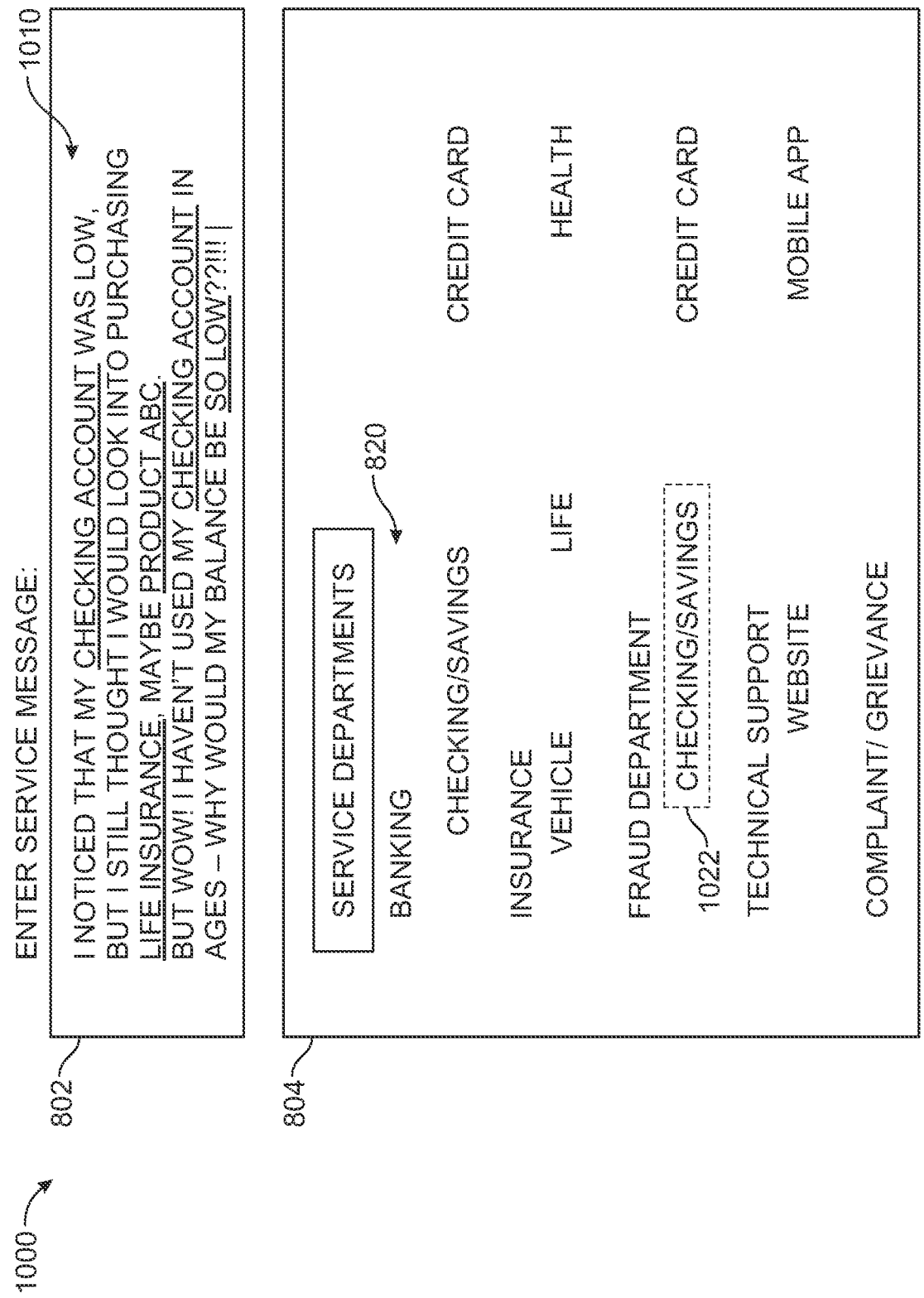

As shown in FIG. 10, continued free-form text data 1010 is shown to indicate "I noticed that my checking account was low, but I still thought I would look into purchasing life insurance, maybe product ABC" with an additional message portion indicating "But wow! I haven't used my checking account in ages—why would it be so low??!!!" Now it is likely that the user intends to report fraudulent activity in relation to his checking account. Example detected intents and emotions are shown as underlined text (e.g., checkingaccount, lifeinsurance, productABC, butwow!, checkingaccount, solow??!!!). In display area 804, an indicator 1022 (e.g., a highlighter, icon, box, etc.) may be used to emphasize the selected service department (i.e., fraud department—checking/savings) as determined by the incoming serving message handling function. Again, in some embodiments, indicator 1022 is a moving or movable indicator. Here, again, the free-form input data is being processed substantially in real-time (e.g., in regular or periodic chunks of data) with feedback given substantially in real-time (e.g., in regular or periodic intervals) at the user device.

Figure 11:
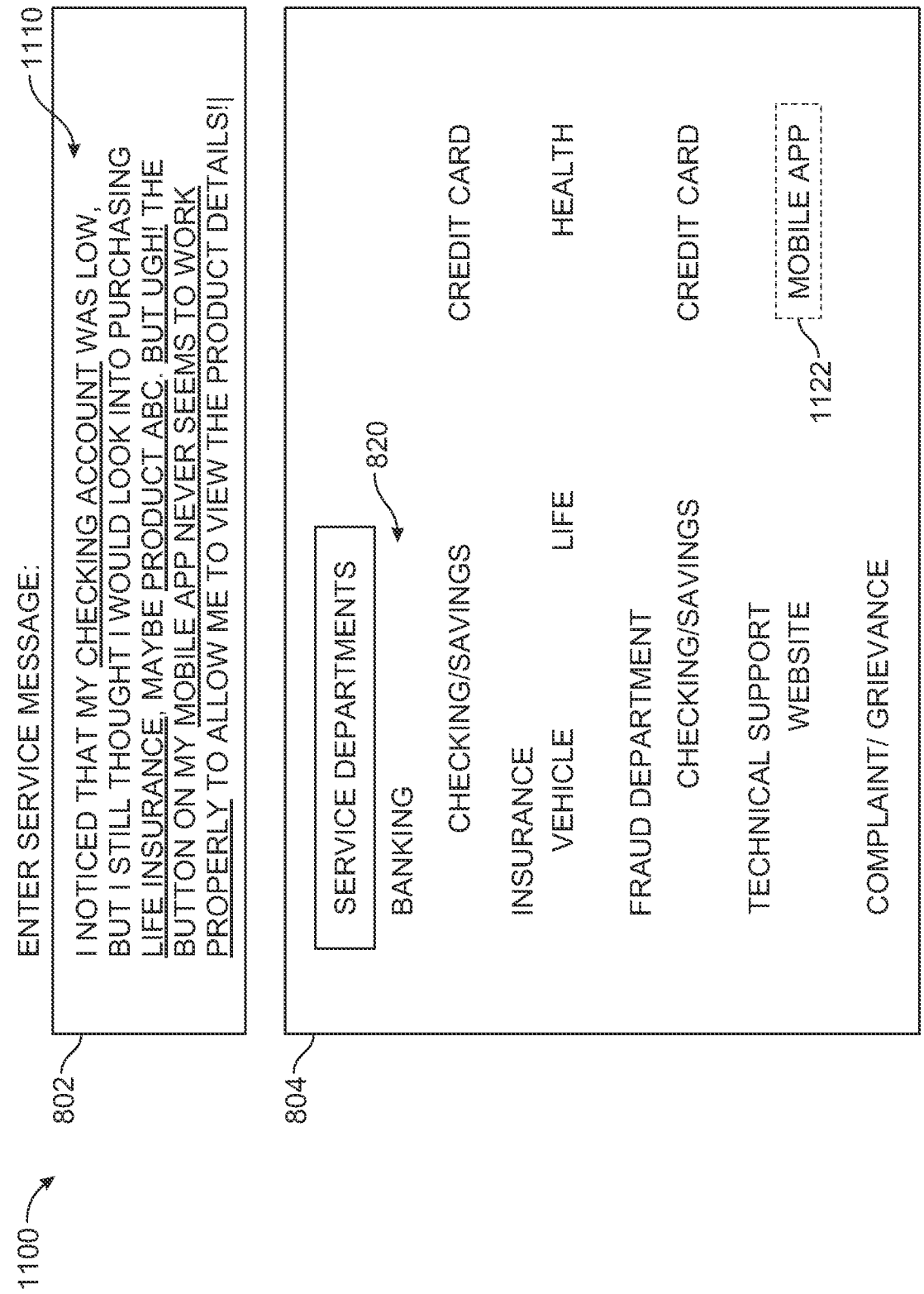

As shown in FIG. 11, continued free-form text data 1110 is shown to indicate an alternative to FIG. 10, particularly that "I noticed that my checking account was low, but I still thought I would look into purchasing life insurance, maybe product ABC" with an additional message portion indicating "But UGH! The button on my mobile app never seems to work properly to allow me to view the product details!" Now it is likely that the user wants to wants to contact a technical support team for the mobile app of the user. Example detected intents and emotions are shown as underlined text (e.g., checkingaccount, lifeinsurance, productABC, UGH!, mobileapp, neverseemstoworkproperly). In display area 804, an indicator 1122 (e.g., a highlighter, icon, box, etc.) may be used to emphasize the selected service department (i.e., technical support—mobile app) as determined by the incoming serving message handling function. Again, in some embodiments, indicator 1122 is a moving or movable indicator. Here, again, the free-form input data is being processed substantially in real-time (e.g., in regular or periodic chunks of data) with feedback given substantially in real-time (e.g., in regular or periodic intervals) at the user device.

Figure 12:
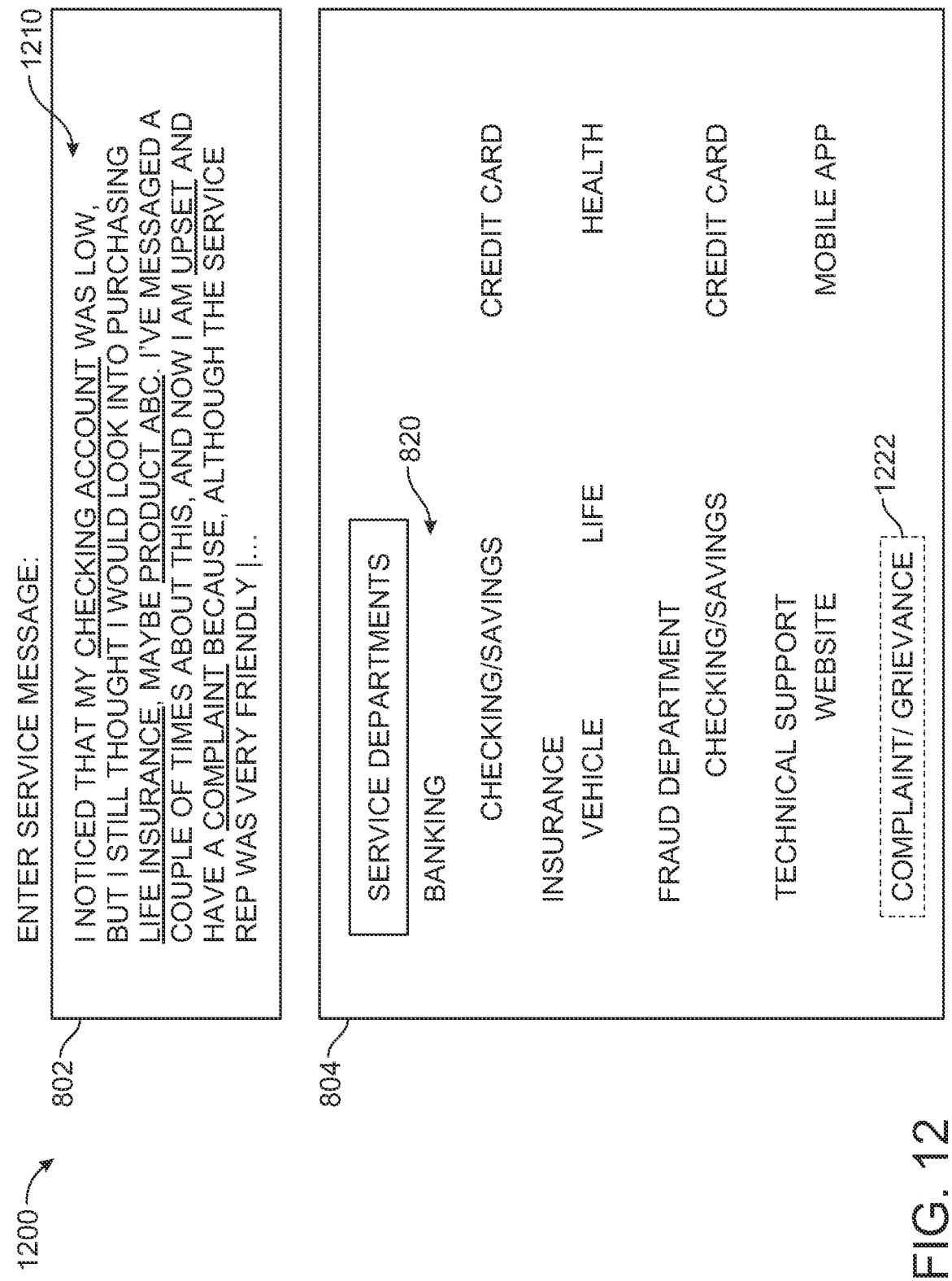

As shown in FIG. 12, continued free-form text data 1210 is shown to indicate an alternative to FIG. 10, particularly that "I noticed that my checking account was low, but I still thought I would look into purchasing life insurance, maybe product ABC" with an additional message portion indicating "I've message a couple of times about this, and now I am upset and have a complaint because, although the service rep was very friendly . . . " Now it is likely that the user intends to file a complaint or grievance in the complaint/grievance department. Example detected intents and emotions are shown as underlined text (e.g., checkingaccount, lifeinsurance, productABC, upset, compliant). In display area 804, an indicator 1222 (e.g., a highlighter, icon, box, etc.) may be used to emphasize the selected service department (i.e., complaint/grievance) as determined by the incoming serving message handling function. Again, in some embodiments, indicator 1222 is a moving or movable indicator. Here, again, the free-form input data is being processed substantially in real-time (e.g., in regular or periodic chunks of data) with feedback given substantially in real-time (e.g., in regular or periodic intervals) at the user device.

Although particular user interface widgets in a GUI have been shown and described, any one or more types of different widgets may be utilized. Such widgets include icons, pull-down menus, buttons, selection boxes, progress indicators, on-off checkmarks, scroll bars, windows, window edges (e.g., that allow resizing of a window), toggle buttons, form, and many other devices for displaying information and for inviting, accepting, and responding to user actions.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (IPsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method comprising:
at one or more servers configured to process incoming service messages for customers which are account holders of accounts that are managed at least in part by a service provider,
receiving an incoming service message from a user device via a network, the incoming service message including free-form input data from the user device, wherein receiving the free-form input data comprises receiving the incoming service message in a plurality of consecutive message portions during input of the free-form input data;
processing the free-form input data in real-time to determine one or more intent classifiers by processing each consecutive message portion of the plurality of consecutive message portions in real-time;
for a first consecutive message portion of the plurality of consecutive message portions processed, selecting one of a plurality of service department identifiers based on the one or more intent classifiers;
sending data for display at the user device via the network, the data for display including a display item corresponding to the selected service department identifier;
wherein the user device includes a display area and wherein the display item corresponding to the selected service department identifier is emphasized using an indicator on the display area of the user device;
for each next consecutive message portion of the consecutive message portions processed after the first consecutive message portion, sending updated data for display at the user device via the network, the updated data for display including an updated display item corresponding to an updated selected service department identifier for real-time feedback during the input of the free-form input data;
wherein the indicator on the display area of the user device is a moving indicator that responds in real-time to the updated data for display to emphasize the updated display item corresponding to the updated selected service department identifier in response to each processed consecutive message portion;
selecting one of a plurality of service representative identifiers associated with the selected service department identifier; and
sending a message to the selected service representative identifier, the message including an identifier for identifying information associated with the incoming service message.

2. The method of claim 1, further comprising;
in the processing of the free-form input data, performing an artificial intelligence function to determine the one or more intent classifiers.

3. The method of claim 1, further comprising;
in the processing of the free-form input data, performing a natural language understanding function to determine the one or more intent classifiers.

4. The method of claim 1, wherein:
selecting the service representative identifier further comprises selecting the service representative identifier based on the one or more intent classifiers.

5. The method of claim 1, wherein:
processing the free-form input data further comprises processing the free-form input data to determine one or more emotion classifiers based on the free-form data,
selecting the service department identifier further comprises selecting the service department identifier based on the one or more intent classifiers and the one or more emotion classifiers.

6. The method of claim 1, wherein the free-form input data comprises free-form text data.

7. The method of claim 1, wherein the free-form input data comprises free-form audio data, the method further comprising:
at the one or more servers,
converting the free-form audio data into free-form text data,
wherein processing the free-form input data further comprises processing the free-form text data to determine the one or more intent classifiers.

8. The method of claim 7, further comprising:
at the one or more servers,
performing a playback function to playback the free-form audio data to generate an audio signal; and
processing the audio signal to determine one or more emotion classifiers based on the audio signal,
wherein selecting the service department identifier further comprises selecting the service department identifier based on the one or more intent classifiers and the one or more emotion classifiers.

9. The method of claim 1, wherein:
selecting the service department identifier further comprises selecting the service department identifier based on the one or more intent classifiers and user-related data associated with an account of a user associated with the user device,
the user-related data comprising historical satisfaction data of the user, historical service data of the user, and/or status data associated with the account of the user.

10. The method of claim 1, further comprising:
at the one or more servers,
processing the message in accordance with a selected one of a plurality of message handling instructions, based on a matching of the one or more intent classifiers and the one or more emotion identifiers associated with the incoming service message with one of a plurality of stored rules.

11. The method of claim 1, wherein the identifier comprises a pointer or link for identifying, in a database, the information associated with the incoming service message.

12. The method of claim 11, wherein the display item comprises a user input prompt for user confirmation of the selected service department identifier and/or the selected service representative identifier.

13. The method of claim 1, wherein the user device includes a native software application that provides the display area in the form of a graphical user interface.

14. A computing device comprising:
one or more processors;
a network interface for connecting to a network for communications with a user device;
memory for storing instructions which are executable on the one or more processors;
the instructions being for processing incoming service messages for customers which are account holders of accounts that are managed at least in part by a service provider including:
  receiving an incoming service message from a user device via a network, the incoming service message including free-form input data from the user device, the free-form input data comprising one of free-form text data or free-form audio data, wherein receiving the free-form input data comprises receiving the incoming service message in a plurality of consecutive message portions during input of the free-form input data;
  processing the free-form input data in real-time to determine one or more intent classifiers by processing each consecutive message portion of the plurality of consecutive message portions in real-time;
  for a first consecutive message portion of the plurality of consecutive message portions processed, selecting one of a plurality of service department identifiers based on the one or more intent classifiers;
  sending data for display at the user device via the network, the data for display including a display item corresponding to the selected service department identifier;
  wherein the user device includes a display area and wherein the display item corresponding to the selected service department identifier is emphasized using an indicator on the display area of the user device;
  for each next consecutive message portion of the consecutive message portions processed after the first consecutive message portion, sending updated data for display at the user device via the network, the updated data for display including an updated display item corresponding to an updated selected service department identifier for real-time feedback during the input of the free-form input data;
  wherein the indicator on the display area of the user device is a moving indicator that responds in real-time to the updated data for display to emphasize the updated display item corresponding to the updated selected service department identifier in response to each processed consecutive message portion;
  selecting one of a plurality of service representative identifiers associated with the selected service department identifier; and
  sending a message to the selected service representative identifier, the message including an identifier for identifying information associated with the incoming service message.

15. The computing device of claim 14, wherein the instructions are further for:
in the processing of the free-form input data, performing a natural language understanding function to determine the one or more intent classifiers.

16. The computing device of claim 14, wherein:
selecting the service representative identifier further comprises selecting the service representative identifier based on the one or more intent classifiers;
processing the free-form input data further comprises processing the free-form input data to determine one or more emotion classifiers based on the free-form data;
selecting the service department identifier further comprises selecting the service department identifier based on the one or more intent classifiers and the one or more emotion classifiers.

17. A computer program product comprising:
a non-transitory computer readable medium;
instructions stored in the non-transitory computer readable medium;
the instructions being executable by one or more processors of a server for processing incoming service messages for customers which are account holders of accounts that are managed at least in part by a service provider including:
  receiving an incoming service message from a user device via a network, the incoming service message including free-form input data from the user device, the free-form input data comprising one of free-form text data or free-form audio data, wherein receiving the free-form input data comprises receiving the incoming service message in a plurality of consecutive message portions during input of the free-form input data;
  processing the free-form input data in real time to determine one or more intent classifiers and one or more emotion classifiers by processing each consecutive message portion of the plurality of consecutive message portions in real-time;
  for a first consecutive message portion of the plurality of consecutive message portions processed, selecting one of a plurality of service department identifiers based on the one or more intent classifiers and the one or more emotion classifiers;
  sending data for display at the user device via the network, the data for display including a display item corresponding to the selected service department identifier;
  wherein the user device includes a display area and wherein the display item corresponding to the selected service department identifier is emphasized using an indicator on the display area of the user device;
  for each next consecutive message portion of the consecutive message portions processed after the first consecutive message portion, sending updated data for display at the user device via the network, the updated data for display including an updated display item corresponding to an updated selected service department identifier for real-time feedback during the input of the free-form input data;
  wherein the indicator on the display area of the user device is a moving indicator that responds in real-time to the updated data for display to emphasize the updated display item corresponding to the updated selected service department identifier in response to each processed consecutive message portion;

selecting one of a plurality of service representative identifiers associated with the selected service department identifier; and sending a message to the selected service representative identifier, the message including an identifier for identifying information associated with the incoming service message.

18. The computer program product of claim 17, wherein the instructions are executable by the one or more servers for:

in the processing of the free-form input data, performing a natural language understanding function to determine the one or more intent classifiers.

19. The computer program product of claim 17, wherein the identifier comprises a pointer or link for identifying, in a database, the information associated with the incoming service message.

20. The computer program product of claim 17, wherein:

selecting the service representative identifier further comprises selecting the service representative identifier based on the one or more intent classifiers;

processing the free-form input data further comprises processing the free-form input data to determine one or more emotion classifiers based on the free-form data, selecting the service department identifier further comprises selecting the service department identifier based on the one or more intent classifiers and the one or more emotion classifiers.

\* \* \* \* \*